United States Patent
Hattori

(10) Patent No.: US 7,772,714 B2
(45) Date of Patent: Aug. 10, 2010

(54) PASSIVE SAFETY DEVICE FOR VEHICLES

(75) Inventor: Hiroshi Hattori, Chita-gun (JP)

(73) Assignee: Denso Corporation, Kariya (JP)

( * ) Notice: Subject to any disclaimer, the term of this patent is extended or adjusted under 35 U.S.C. 154(b) by 261 days.

(21) Appl. No.: 12/006,496

(22) Filed: Jan. 3, 2008

(65) Prior Publication Data

US 2008/0164760 A1    Jul. 10, 2008

(30) Foreign Application Priority Data

Jan. 9, 2007    (JP) .............................. 2007-001779

(51) Int. Cl.
*H02J 9/00*    (2006.01)
(52) U.S. Cl. ........................... 307/9.1; 307/10.1; 307/64
(58) Field of Classification Search ........................ None
See application file for complete search history.

(56) References Cited

U.S. PATENT DOCUMENTS

| | | | | |
|---|---|---|---|---|
| 5,146,104 | A | * | 9/1992 | Schumacher et al. ....... 307/10.1 |
| 5,420,790 | A | * | 5/1995 | Ravas et al. ................ 307/10.1 |
| 5,646,454 | A | * | 7/1997 | Mattes et al. .............. 307/10.1 |
| 6,486,566 | B1 | * | 11/2002 | Schumacher et al. ....... 307/10.1 |
| 6,555,933 | B2 | * | 4/2003 | Cook et al. ................. 307/10.1 |
| 2004/0164534 | A1 | | 8/2004 | Higashiyama |

FOREIGN PATENT DOCUMENTS

| | | |
|---|---|---|
| JP | 09-188220 | 7/1997 |
| JP | 10-217902 | 8/1998 |
| JP | 10-278726 | 10/1998 |
| JP | 2001-171477 | * 6/2001 |
| JP | 2001-341612 | * 12/2001 |
| JP | 2002-019571 | 1/2002 |
| JP | 2007-082332 | 3/2007 |

OTHER PUBLICATIONS

Machine translations for JP2001-171477 and JP2001-341612.*
Office Action dated Oct. 21, 2008 in Japanese Application No. 2007-001779 with English translation.
Office Action dated Sep. 8, 2009 in corresponding Japanese Application No. 2007-001779.

* cited by examiner

*Primary Examiner*—Fritz M Fleming
(74) *Attorney, Agent, or Firm*—Harness, Dickey & Pierce, PLC

(57) ABSTRACT

A passive safety device for vehicles to ensure the characteristics of a power source for a drive circuit and further simplify circuitry and reduce costs is provided. An airbag device includes a battery, a voltage converter, a backup power source, a FET driver circuit, a FET, and a power source for the FET driver circuit. The driver circuit power source includes capacitors, the capacitance of which are so set that, when the output voltage is interrupted, the voltage of the driver circuit power source more gently drops than that of the backup power source 4, making it unnecessary to use a charge pump circuit.

16 Claims, 3 Drawing Sheets

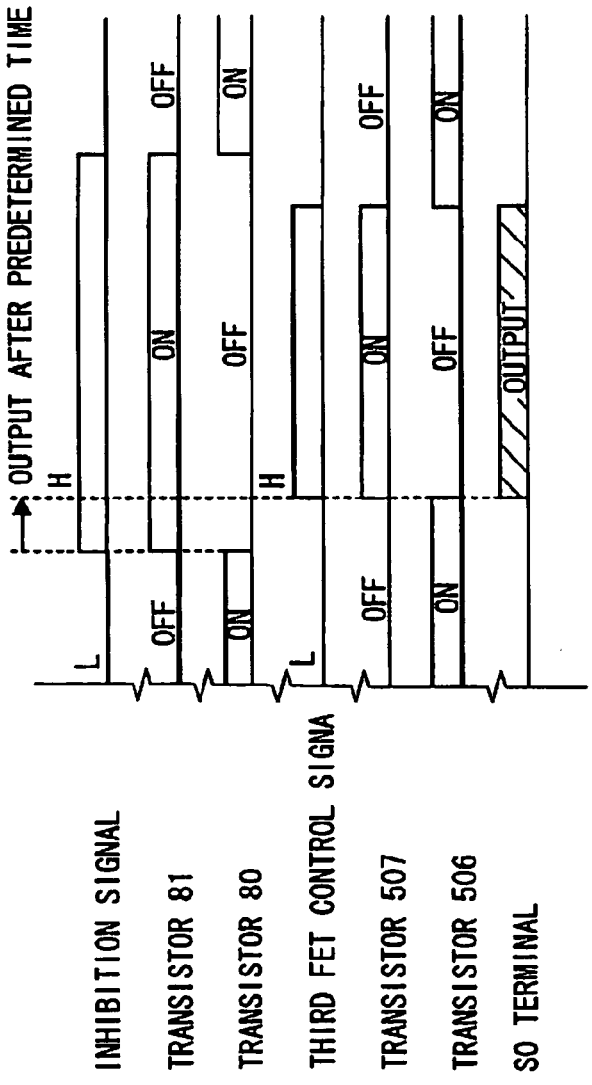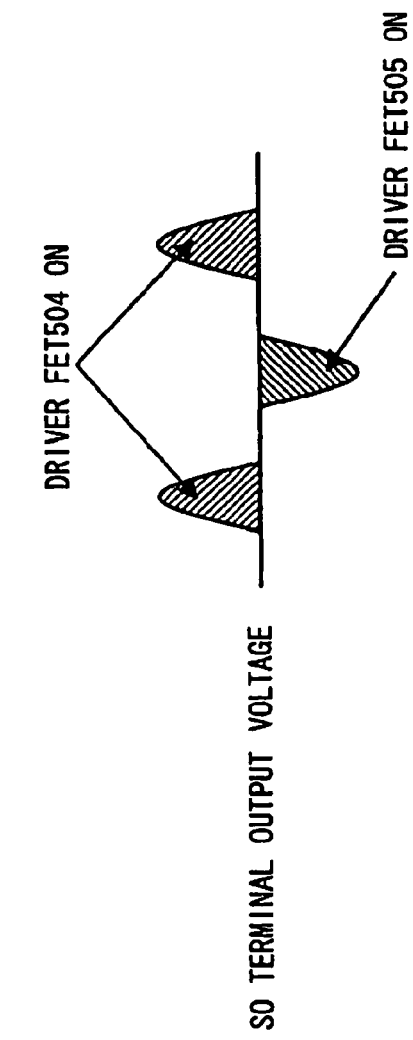
FIG. 2
FIG. 3

PASSIVE SAFETY DEVICE FOR VEHICLES

CROSS REFERENCE TO RELATED APPLICATIONS

The present invention is based on and claims priority to unpublished Japanese Patent Application No. JP 2007-001779 filed on Jan. 9, 2007, the entire contents of which are incorporated herein by reference.

BACKGROUND OF THE INVENTION

1. Field of the Invention

The present invention relates to a passive safety device for the protection of the occupants of a vehicle, and more specifically to supplying power to a passive safety device when a main power source is interrupted.

2. Description of the Related Art

A conventional passive safety device for vehicles such as, for example, an airbag system, is described in JP-A-2004-255911, which includes a switching element for safing, a HI-side switching element, a LO-side switching element, and a drive circuit for driving the switching elements. The switching element for safing, HI-side switching element, and LO-side switching element are connected in series. The switching element for safing is connected to a power source. A squib is placed between the HI-side switching element and the LO-side switching element.

In a typical scenario, the power source is constructed of a battery, a voltage converter, and a backup power source. The voltage converter increases the output voltage of the battery and outputs it. The backup power source is charged with the output voltage of the voltage converter. When the output of the voltage converter is interrupted, the backup power source supplies voltage in place of the voltage converter. The switching element for safing is driven by the drive circuit and turns the output voltage of the voltage converter or the backup power source to a predetermined target voltage and supplies it to the Hi-side switching element.

During backup operation, the output voltage of the backup power source drops with the lapse of time. When the switching element for safing is a FET (Field-Effect Transistor), for example, the following takes place: when the output voltage of the backup power source becomes less than or equal to a target voltage, the output source voltage cannot be controlled to the target voltage. It is therefore required to fully turn on the switching element for safing to directly supply the output voltage of the backup power source to the HI-side switching element. To fully turn on the switching element for safing, the gate voltage must be made higher than the source voltage. Using only the backup power source, however, the gate voltage cannot be made higher than the source voltage. Consequently, a charge pump circuit is generally used as a power source for the drive circuit so that a certain gate voltage can be ensured even when the output voltage of the backup power source drops during backup operation.

However, a charge pump circuit is complicated and requires an increased number of parts. Therefore, use of a charge pump circuit makes it difficult to reduce the cost of an airbag system.

SUMMARY OF THE INVENTION

The invention has been made in view of the above circumstances. It is an object of the invention to provide a passive safety device for vehicles wherein it is possible to ensure the characteristics of a power source for a drive circuit and further simplify its circuitry and reduce its cost.

To solve the above problem, a power source for a drive circuit is constructed of a capacitor whose capacitance is so set that during backup operation, its voltage more gently drops than that of a backup power source.

More specifically, a passive safety device for vehicles includes: a main power source; a backup power source that, when power supply from the main power source is interrupted, supplies voltage in place of the main power source; a switching element disposed between the main power source and a firing circuit; a drive circuit that drives the switching element so that a predetermined voltage is supplied to the firing circuit; and a power source for the drive circuit that is connected to the main power source. When power supply from the main power source is interrupted, the power source for the drive circuit supplies voltage to the drive circuit in place of the main power source. The passive safety device can be characterized in that: the power source for the drive circuit is constructed of a capacitor charged by the main power source; and the capacitor is so set that, when power supply from the main power source is interrupted, the capacitor voltage more gently drops than that of the backup power source.

With the above described construction, it is possible to ensure the characteristics of the power source for the drive circuit and further simplify circuitry and reduce a cost. The power source for the drive circuit is constructed of the capacitor, the capacitance of which is so set that, when power supply from the main power source is interrupted, the capacitor voltage more gently drops than that of the backup power source. Accordingly, conventional voltage characteristics can be ensured through the use of simple circuitry and without the use of a charge pump circuit that is typically required in conventional cases and making it possible to reduce the cost of the passive safety device for vehicles.

A passive safety device for vehicles can be further characterized in that the power source for the drive circuit is constructed of multiple capacitors connected in parallel. In such a construction, even if one capacitor becomes faulty, voltage can be supplied by a remaining capacitor enhancing the reliability of the passive safety device.

A passive safety device for vehicles can be further characterized in that the drive circuit operates so that it does not ground the output of the power source for the drive circuit. In such a construction, discharging of a capacitor that constructs the power source for the drive circuit can be suppressed and a voltage required for driving can be ensured for a longer time.

A passive safety device for vehicles can be further characterized in that a drive inhibition circuit can be included that grounds the output of the drive circuit to inhibit the drive circuit from driving the switching element and malfunction of the switching element due to a fault in the drive circuit can thereby be prevented.

A passive safety device for vehicles can still further be characterized in that the drive circuit and the drive inhibition circuit operate so that they do not ground the output of the power source for the drive circuit and discharging of a capacitor that constructs the power source for the drive circuit can be suppressed. Accordingly, a voltage required for driving can be ensured for a longer time.

BRIEF DESCRIPTION OF THE DRAWINGS

Other objects, features and characteristics of the present invention will be appreciated and become apparent to those of ordinary skill in the art and all of which form a part of the present application. In the drawings:

FIG. 2 is a timing diagram illustrating the operation of a drive circuit and a drive inhibition circuit;

FIG. 3 is a graphical diagram illustrating an exemplary output voltage waveform of an SO terminal of an airbag control IC.

DETAILED DESCRIPTION OF THE EXEMPLARY EMBODIMENTS

More detailed description will be given to the invention with the following exemplary embodiments discussed and described for illustrative purposes and not to limit the scope and interpretation of the invention. In the description of the following embodiments, an exemplary case will be used where a passive safety device for vehicles of the invention is applied to an airbag device.

First Embodiment

Figure 1:
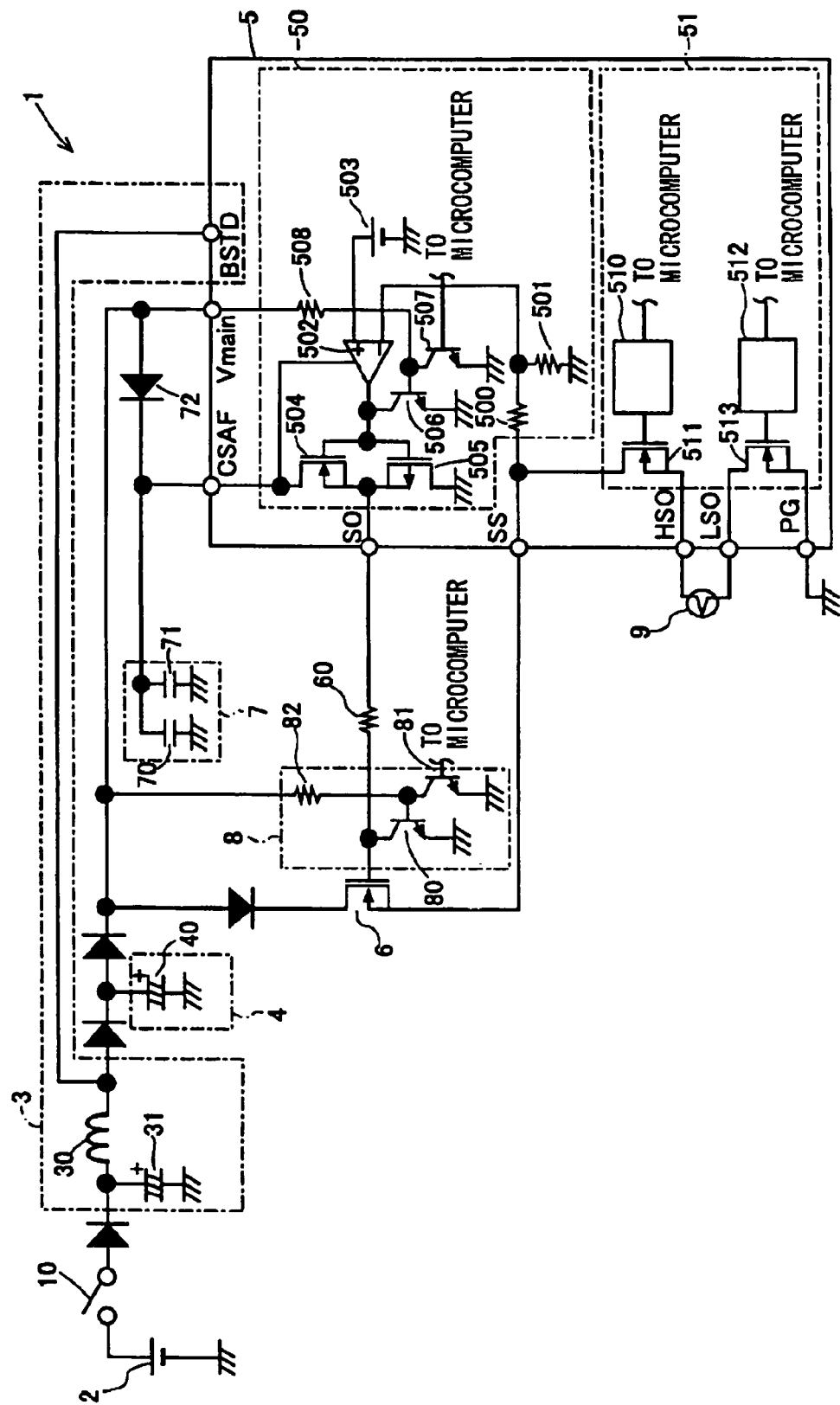
FIG. 1 is a circuit diagram illustrating an airbag device in accordance with a first embodiment.

Description of the configuration of an airbag device in accordance with a first embodiment will now be provided with reference to FIG. 1. As illustrated, a passive safety device for vehicles, such as an airbag device 1 includes: a main power source such as a battery 2, a main power source such as a voltage converter 3, a backup power source 4, an airbag control IC 5, a switching element such as a third FET 6 in addition to first and second FETs such as, for example, a LO side FET and a HI side FET to be described hereinafter, a power source for a drive circuit, such as a power source 7 for a third FET driver circuit, a drive inhibition circuit such as an inhibition circuit 8, and a squib 9.

The battery 2 is an accumulator that outputs direct-current voltage. The voltage converter 3 is a circuit for increasing the output voltage of the battery 2. The voltage converter 3 is constructed of a coil 30, a capacitor 31, and a switching element and the like (not shown). One end of the coil 30 is connected with the capacitor 31. The other end of the coil 30 is connected with a switching element and the like constructed in the airbag control IC 5. The one end of the coil 30 is the input terminal of the voltage converter 3 and is connected to the positive terminal of the battery 2 through an ignition switch 10. The negative terminal of the battery 2 is grounded. The other end of the coil 30 is the output terminal of the voltage converter 3 and is connected to the backup power source 4, airbag control IC 5, third FET 6, and power source 7. Backflow preventing diodes are placed between the ignition switch 10 and the voltage converter 3 and between the voltage converter 3 and each of the backup power source 4, airbag control IC 5, third FET 6, and power source 7 for a third FET driver circuit.

The backup power source 4 is constructed of a capacitor 40 and is charged by the voltage converter 3. When the output voltage of the voltage converter 3 is interrupted, the backup power source 4 feeds power in place of the voltage converter 3. The backup power source 4 is connected to the other end of the coil 30 and is the output terminal of the voltage converter 3 for charging. In order to supply voltage in place of the voltage converter 3, the backup power source 4 is connected to the airbag control IC 5 and the third FET 6. Backflow preventing diodes are placed between the backup power source 4 and each of the airbag control IC 5 and the third FET 6.

The airbag control IC 5 controls current passed through the squib 9 based on a control signal outputted by a microcomputer (not shown). The airbag control IC 5 includes a third FET driver circuit 50 and a firing circuit 51.

The third FET driver circuit 50 drives the third FET 6 so that the output voltage of the third FET 6 becomes equal to a predetermined target voltage based on a control signal from the microcomputer. The third FET driver circuit 50 is constructed of resistors 500, 501, an operational amplifier 502, a reference power source 503, driver FETs 504, 505, transistors 506, 507, and a resistor 508.

The resistors 500, 501 are connected in series and divide the source voltage of the third FET 6. One end of the series connected resistors 500, 501 is connected to an SS terminal and the other end is grounded. The junction point between the resistors 500, 501 is connected to the operational amplifier 502.

The operational amplifier 502 amplifies the source voltage of the third FET 6 as divided by the resistors 500, 501 and on the basis of the voltage of the reference power source 503. The positive input terminal of the operational amplifier 502 is connected to the reference power source 503, and its negative input terminal is connected to the junction point between the resistors 500, 501. The voltage of the reference power source 503 is set to a value obtained by multiplying a predetermined target voltage supplied to the firing circuit 51 by a voltage dividing ratio determined by the resistors 500, 501. The output terminal is connected to a push-pull circuit constructed, for example, of the driver FETs 504, 505 to be described in greater detail hereinafter. The power supply terminal of the operational amplifier 502 is connected to a CSAF terminal.

The driver FETs 504, 505 control the gate voltage of the third FET 6 so that the source voltage of the third FET 6 becomes equal to a predetermined target voltage. The driver FET 504, in the present exemplary embodiment, is an n-channel MOSFET, and the driver FET 505 is a p-channel MOSFET. The driver FETs 504, 505 are connected so as to construct a push-pull circuit. The source and gate of the driver FET 504 are respectively connected to the source and gate of the driver FET 505. The drain of the driver FET 504 is connected to the CASF terminal, and the drain of the driver FET 505 is grounded. The sources of the driver FETs 504, 505 are connected to an SO terminal and their gates are connected to the output terminal of the operational amplifier 502.

The transistors 506, 507 are elements for controlling the output of the operational amplifier 502 based on a control signal from the microcomputer. The collector of the transistor 506 is connected to the output terminal of the operational amplifier 502, and its emitter is grounded. Its base is connected to a Vmain terminal through the resistor 508. The collector of the transistor 507 is connected to the base of the transistor 506, and its emitter is grounded. Its base is connected to the microcomputer.

The firing circuit 51 controls a spark current passed through the squib 9. The firing circuit 51 is constructed of a high-side FET driver circuit 510, a high-side FET 511, a low-side FET driver circuit 512, and a low-side FET 513.

The high-side FET driver circuit 510 drives the high-side FET 511 so that a current passed through the squib 9 becomes equal to a predetermined current based on a control signal from the microcomputer. The high-side FET 511 is connected to one end of the squib 9 to control a current passed therethrough. The input terminal of the high-side FET driver circuit 510 is connected to the microcomputer, and the output terminal is connected to the gate of the high-side FET 511.

The drain of the high-side FET 511 is connected to the SS terminal, and the source is connected to a high-side output (HSO) terminal.

The low-side FET driver circuit 512 drives the low-side FET 513 based on a control signal from the microcomputer. The low-side FET 513 is connected to the other end of the squib 9, and grounds the squib 9. The input terminal of the low-side FET driver circuit 512 is connected to the microcomputer, and the output terminal is connected to the gate of the low-side FET 513. The drain of the low-side FET 513 is connected to a low-side output (LSO) terminal, and the source is connected to a PG terminal that is grounded.

The third FET 6 is disposed between the voltage converter 3 and backup power source 4 and the airbag control IC 5, and it is an element for controlling voltage supplied to the firing circuit 51. The drain of the third FET 6 is connected to the voltage converter 3 and the backup power source 4. The source of the third FET 6 is connected to the third FET driver circuit 50 and the firing circuit 51 through the SS terminal of the airbag control IC 5. The gate of the third FET 6 is connected to the SO terminal of the airbag control IC 5 through a resistor 60 and is thus connected to the third FET driver circuit 50.

The power source 7 is constructed of capacitors 70, 71 connected in parallel, and supplies voltage to the third FET driver circuit 50 in place of the voltage converter 3 when the output voltage of the voltage converter 3 is interrupted. The capacitance of the capacitors 70, 71 is so set that when the output voltage of the voltage converter 3 is interrupted the capacitor voltage more gently drops than that of the backup power source 4. One end of the respective parallel connected capacitors 70, 71 is connected to the voltage converter 3 and the backup power source 4, and the other ends are grounded. A backflow preventing diode 72 is connected between the voltage converter 3 and the backup power source 4. The parallel connected capacitors 70, 71 are also connected on one end to the third FET driver circuit 50 through the CSAF terminal of the airbag control IC 5.

The inhibition circuit 8 inhibits firing based on an inhibition signal from the microcomputer. The inhibition circuit 8 is constructed of transistors 80, 81 and a resistor 82. The collector of the transistor 80 is connected to the gate of the third FET 6, and the emitter is grounded. The base of the transistor 80 is connected to the voltage converter 3 and the backup power source 4 through the resistor 82. The collector of the transistor 81 is connected to the base of the transistor 80, and the emitter is grounded. The base of the transistor 81 is connected to the microcomputer.

The squib 9 is fired when a current passed therethrough causes an airbag (not shown) to deploy. One end of the squib 9 is connected to the source of the high-side FET 511 through the HSO terminal, and the other end is connected to the drain of the low-side FET 513 through the LSO terminal.

Description will now be given of the operation of the airbag device with reference to FIG. 1 through FIG. 3. FIG. 2 shows timing associated with the operation of the drive circuit and the drive inhibition circuit. FIG. 3 illustrates the output voltage waveform of the SO terminal of the airbag control IC.

When the ignition switch 10 in FIG. 1 is turned on, the battery 2 is connected to the voltage converter 3, which increases the output voltage of the battery 2 and outputs the increased voltage to the backup power source 4, airbag control IC 5, third FET 6, and power source 7. The capacitor 40 of the backup power source 4 and the capacitors 70, 71 of the power source 7 are charged by the voltage converter 3.

The microcomputer outputs a low-level (L-level) third FET control signal to the transistor 507 of the third FET driver circuit 50. When the L-level signal is inputted, the transistor 507 is turned off. The transistor 506 is consequently turned on, and the output terminal of the operational amplifier 502 is grounded. Accordingly, the driver FETs 504, 505 are both turned off, and voltage is not outputted from the SO terminal as the output terminal of the third FET driver circuit 50.

Further, the microcomputer outputs an L-level inhibition signal to the transistor 81 of the inhibition circuit 8. When the L-level signal is inputted, the transistor 81 is turned off. The transistor 80 is consequently turned on, and the SO terminal as the output terminal of the third FET driver circuit 50 is grounded through the resistor 60. Accordingly, even when the third FET driver circuit 50 outputs voltage due to some fault, the third FET 6 is not driven.

When it is determined that the relevant vehicle has collided, the microcomputer causes an inhibition signal to transition from L-level to a high-level (H-level) as illustrated in FIG. 2. When the H-level signal is inputted, the transistor 81 is turned on and the transistor 80 is consequently turned off. The output of the third FET driver circuit 50 can be inputted to the gate of the third FET 6. When a predetermined time has elapsed, the microcomputer causes the third FET control signal to transition from L-level to H-level. When the H-level signal is inputted, the transistor 507 is turned on. The transistor 506 is consequently turned off, and the output of the operational amplifier 502 can be inputted to the push-pull circuit constructed of the driver FETs 504 and 505. The operational amplifier 502 amplifies the source voltage of the third FET 6 divided by the resistors 500 and 501 on the basis of the voltage of the reference power source 503. As illustrated in FIG. 3, the driver FETs 504 and 505 are repeatedly turned on and off based on the output of the operational amplifier 502. The driver FETs 504 and 505 output voltage from the SO terminal so that the source voltage of the third FET 6 becomes equal to the predetermined target voltage. During such an interval, the driver FETs 504, 505 are not simultaneously turned on. The third FET 6 is driven based on the output of the push-pull circuit constructed of the driver FETs 504, 505, and supplies the predetermined target voltage to the firing circuit 51 through the SS terminal.

The microcomputer outputs a high-side FET control signal and a low-side FET control signal. When these control signals are inputted, the high-side FET driver circuit 510 drives the high-side FET 511 so that a current passed through the squib 9 becomes equal to a predetermined current. The low-side FET driver circuit 512 turns on the low-side FET 513 to ground the other end of the squib 9. Thus, a spark current is passed through the squib 9, and the squib is fired causing an airbag to deploy to protect an occupant.

If the battery 2 is dislodged due to a collision and the output voltage of the voltage converter 3 is interrupted, the backup power source 4 supplies voltage in place of the voltage converter 3. It should be noted that the disruption of battery power can be detected by signal or voltage level applied to a BSTD pin, or the like, which signal or voltage level will be removed if battery voltage is interrupted. During backup operation, the output voltage of the backup power source can be consumed in various circuits and parts and therefore the output voltage level drops with the passage of time. When the output voltage of the backup power source 4 becomes less than or equal to a predetermined target voltage, the source voltage of the third FET 6 cannot be controlled or adjusted to meet the target voltage. In such a case, the third FET 6 must be fully turned on and the output voltage of the backup power source 4 must be directly supplied to the firing circuit 51. However, the third FET driver circuit 50 is supplied with voltage from the power source 7. Furthermore, with respect to the power source 7, the capacitance of the capacitors 70, 71 is adjusted so that its voltage more gently drops than that of the backup power source 4. Accordingly, even when the output voltage of the backup power source 4 drops, the gate voltage of the third FET 6 can be made higher than its source voltage. Thus, the third FET 6 can be fully turned on with a relatively high degree of reliability.

As illustrated in FIG. 2, voltage is output from the SO terminal while the inhibition circuit 8 is off. Accordingly, the output of the power source 7 is not grounded by the driver FET 504 and the transistor 80. The output of the power source 7 is further not grounded through the driver FETs 504, 505. Accordingly, discharging of the capacitors 70, 71 that constitute the power source 7 can be suppressed, and sustaining a voltage level required for driving, for example, the activation of the airbag system can be ensured for a longer time.

Description will be given to the effect of the first embodiment. According to the first embodiment, it is possible to ensure the characteristics of the power source for the third FET driver circuit and further simplify circuitry and reduce costs. The power source 7 is constructed of the capacitors 70, 71. In addition, the capacitance of the capacitors 70, 71 is so set that, when the output voltage of the voltage converter 3 is interrupted, its voltage more gently drops than that of the backup power source 4. Accordingly, conventional voltage characteristics can be ensured using simple circuitry and without the use of a charge pump circuit required in conventional cases, making it possible to reduce the cost of the airbag device 1.

It should be noted that in the first embodiment, the power source 7 is constructed of the two capacitors 70, 71. Therefore, even if one capacitor becomes faulty, voltage can be supplied by the remaining capacitor. Accordingly, the reliability of the airbag device can be enhanced.

Also according to the first embodiment, the output of the power source 7 is not grounded through the driver FETs 504, 505 or through the driver FET 504 and the transistor 80. Accordingly, discharging of the capacitors 70, 71 that construct the power source 7 can be suppressed and sustaining a voltage required for driving can be ensured for a longer time.

It should also be noted that, according to the first embodiment, malfunction of the third FET 6 due to some fault in the third FET driver circuit 50 can be prevented by providing the inhibition circuit 8.

Second Embodiment

Figure 4:
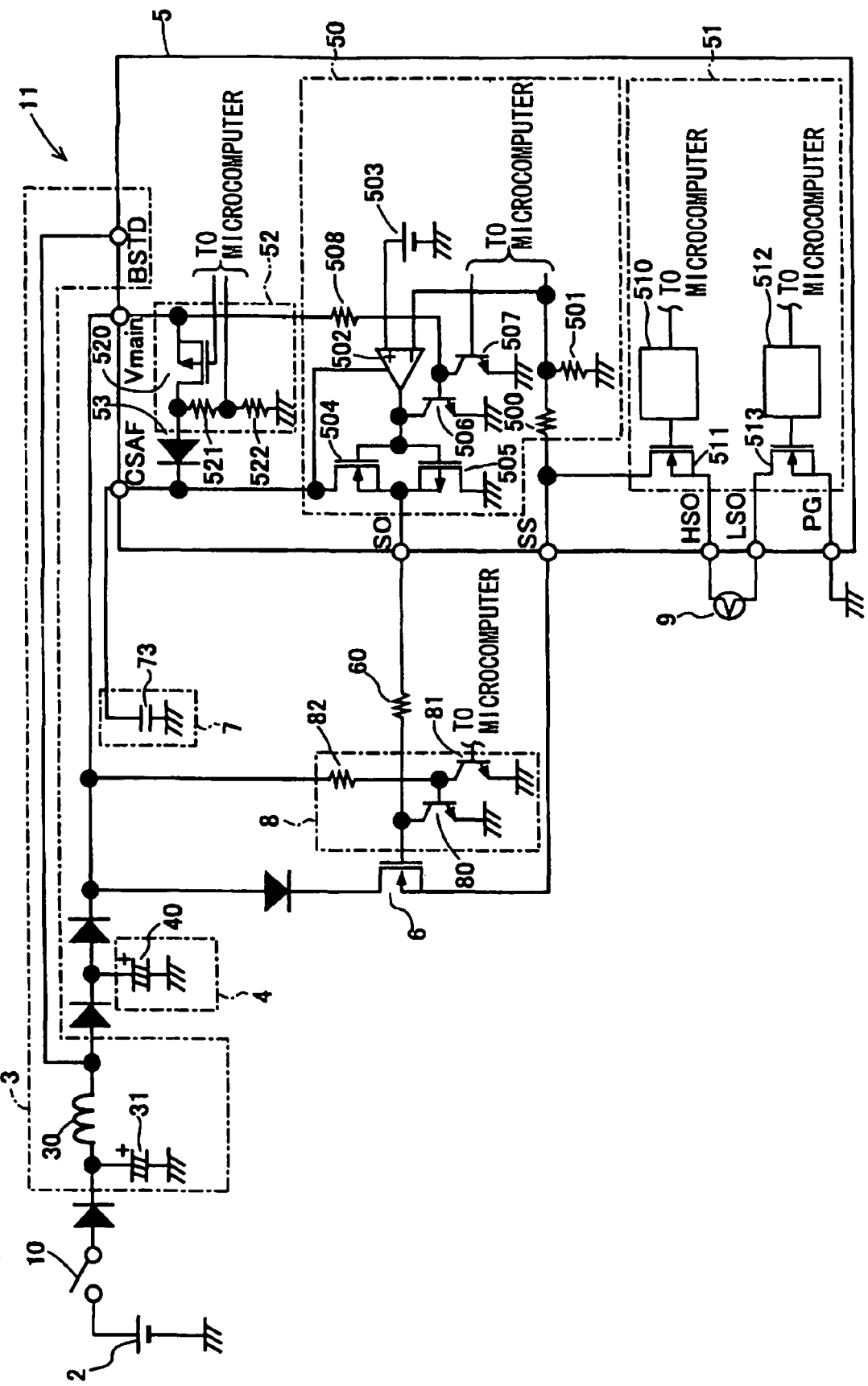
FIG. 4 is a circuit diagram illustrating an airbag device in a second embodiment.

Description will now be provided with reference to FIG. 4 of an airbag device in accordance with a second embodiment. The airbag device in the second embodiment is different from the airbag device in the first embodiment in that the backflow preventing diode of the power source for the third FET driver circuit is incorporated in the airbag control IC. Further, an anomaly detection circuit is provided to reduce the number of the capacitors in the power source for the third FET driver circuit.

The description will be given with a specific focus on the anomaly detection circuit that represents a difference between the second embodiment and the airbag device in the first embodiment. Redundant description will be omitted with respect to common portions unless required for an understanding of the invention. In the following description, elements that are the same as those in the first embodiment described above will use the same reference numerals.

As illustrated in FIG. 4, the airbag control IC 5 includes the third FET driver circuit 50, the firing circuit 51, and an anomaly detection circuit 52. The airbag control IC 5 includes the backflow preventing diode 53 of the power source 7.

The anomaly detection circuit 52 includes FET 520 and resistors 521, 522 and detects any anomaly in the power source 7 and the diode 53, such as, for example, an anomalous output value, characteristic, or the like. Further, the anomaly detection circuit 52 uses the resistors 500, 501 of the third FET driver circuit 50 in a shared manner. The drain of the FET 520 is connected to the anode of the diode 53. The cathode of the diode 53 is connected to the power source 7 through the CSAF terminal. The source of the FET 520 is connected to the voltage converter 3 and the backup power source 4 through the Vmain terminal. The gate of the FET 520 is connected to a microcomputer (not shown) through the drive circuit. The resistors 521, 522 are connected in series and divide the anode voltage of the diode 53. One end of the series connected resistors 521, 522 is connected to the anode of the diode 53, and the other end is grounded. The junction point between the resistors 521, 522 is connected to the microcomputer through a multiplexer. The junction point between the resistors 500, 501 of the third FET driver circuit 50 is also connected to the microcomputer through the multiplexer.

The power source 7 is constructed of a capacitor 73. With respect to the power source 7, the capacitance of the capacitor 73 is so set that, when the output voltage of the voltage converter 3 is interrupted, the capacitor voltage more gently drops than that of the backup power source 4. One end of the capacitor 73 is connected to the cathode of the diode 53 through the CSAF terminal of the airbag control IC 5, and the other end is grounded. The ungrounded end of the capacitor 73 is also connected to the third FET driver circuit 50 through the CSAF terminal of the airbag control IC 5.

Description will now be given to the operation of anomaly detection in accordance with the present exemplary embodiment. It should be noted that a description of the operations other than anomaly detection will be omitted because they are essentially the same as or identical to the airbag device 1 in the first embodiment.

When the ignition switch 10, shown in FIG. 4 is turned on, the microcomputer turns on the FET 520. As a result, the output voltage of the voltage converter 3 is supplied to the power source 7 through the FET 520 and the diode 53. The capacitor 73 of the power source 7 is charged by the voltage converter 3.

When a sufficient time has elapsed to allow charging to be completed, the microcomputer turns off the FET 520 and further turns on the third FET 6 through the third FET driver circuit 50. The microcomputer determines whether or not the third FET 6 has been actually turned on by the voltage of the SS terminal divided by the resistors 500, 501, through the multiplexer. When the third FET 6 has not been turned on, the microcomputer determines that voltage is not supplied due to an open fault in the capacitor 73 and treats the condition as an anomaly.

Further, the microcomputer determines any fault in the diode 53 through the multiplexer by the anode voltage of the diode 53 divided by the resistors 521, 522. When the divided anode voltage is greater than or equal to a predetermined value, the microcomputer determines that a short fault has occurred in the diode 53 and treats the condition as an anomaly.

The effect of the second embodiment is that it is possible to detect any anomaly in the capacitor 73 of the power source 7. Accordingly, it is unnecessary to construct the power source 7 of multiple capacitors to ensure redundancy, unlike in the first embodiment. Therefore, the power source 7 can be reduced in size. Any fault in the backflow preventing diode 53 can be detected, and thus the reliability of the system can be enhanced. In accordance with the second embodiment, the anomaly detection circuit 52 must be added. However, the anomaly detection circuit 52 circuitry is relatively simple and can be constructed in the airbag control IC 5. Therefore, the anomaly detection circuit 52 does not influence the size of the airbag device.

What is claimed is:

1. A passive safety device for vehicles comprising:
   a main power source;
   a backup power source that supplies voltage in place of the main power source when power supply from the main power source is interrupted;
   a switching element disposed between the main power source and a firing circuit;
   a drive circuit driving the switching element so that a predetermined voltage is supplied to the firing circuit;
   a power source for the drive circuit that is connected to the main power source and that supplies voltage to the drive circuit in place of the main power source when power supply from the main power source is interrupted,
   wherein the power source for the drive circuit is constructed of a capacitor charged by the main power source, the capacitor configured such that a voltage thereof drops more slowly than the voltage of the backup power source when power supply from the main power source is interrupted, and
   wherein the drive circuit includes:
   driver switching elements connected so as to construct a push-pull circuit for controlling the switching element; and
   means for operating the driver switching elements so as not to ground the output of the power source for the drive circuit through the driver switching elements.

2. The passive safety device for vehicles according to claim 1,
   wherein the power source for the drive circuit is constructed of a plurality of capacitors connected in parallel.

3. The passive safety device for vehicles according to claim 1, further comprising a drive inhibition circuit configured to selectively ground the output of the drive circuit thereby inhibiting the drive circuit from driving the switching element when inhibiting is selected.

4. The passive safety device for vehicles according to claim 3,
   wherein the operating means operates the drive circuit and the drive inhibition circuit so as not to ground the output of the power source for the drive circuit when inhibiting is not selected.

5. The passive safety device for vehicles according to claim 4,
   wherein the inhibition circuit includes an inhibition switching element which grounds the output of the drive circuit to thereby inhibit the driving of the switching element when the inhibition signal is received, and
   wherein the operating means operates the inhibition switching element so as to be turned off in order to not ground the output of the power source for the drive circuit through the driver switching element and the inhibition switching element.

6. The passive safety device for vehicles according to claim 5,
   wherein the operating means operates the driver switching elements so as not to be simultaneously turned on, and
   wherein the firing circuit includes a high-side switching element connected to one end of a squib, and a low-side switching element connected to an other end of the squib, and
   wherein the switching element is connected to the firing circuit through a terminal to which the high-side switching element is connected.

7. The passive safety device for vehicles according to claim 1,
   wherein the operating means operates the driver switching elements so as not to be simultaneously turned on.

8. The passive safety device for vehicles according to claim 1,
   wherein the firing circuit includes a high-side switching element connected to one end of a squib, and a low-side switching element connected to an other end of the squib, and
   wherein the switching element is connected to the firing circuit through a terminal to which the high-side switching element is connected.

9. A device for enabling a safing operation during a vehicle collision, the device comprising:
   a first power source that supplies a source voltage in place of a main power source when a power supply from the main power source is interrupted;
   a switching element disposed between the main power source and a firing circuit, the switching element for driving the firing circuit during the safing operation; and
   a drive circuit driving the switching element so that a predetermined voltage is supplied to the switching element, the predetermined voltage higher than the source voltage, the predetermined voltage provided by a second power source connected to the main power source, the second power source supplying voltage to the drive circuit in place of the main power source when the power supply from the main power source is interrupted,
   wherein the second power source includes a capacitor charged by the main power source, the capacitor configured such that a voltage thereof drops more slowly than the source voltage when the power supply from the main power source is interrupted, and
   wherein the drive circuit includes:
   driver switching elements connected so as to construct a push-pull circuit for controlling the switching element; and
   means for operating the driver switching elements so as not to ground the output of the power source for the drive circuit through the driver switching elements when the power supply from the main power source is interrupted.

10. The passive safety device for vehicles according to claim 9, wherein the second power source includes one or more additional capacitors connected in parallel.

11. The passive safety device for vehicles according to claim 9, further comprising an inhibition circuit configured to ground the output of the drive circuit to thereby inhibit the driving of the switching element when an inhibition signal is received.

12. The passive safety device for vehicles according to claim 11,
    wherein the operating means operates the drive circuit and the inhibition circuit so as not to ground the output of the second power source for the drive circuit when the inhibition signal is not received.

13. The passive safety device for vehicles according to claim 12,
    wherein the inhibition circuit includes an inhibition switching element which grounds the output of the drive circuit to thereby inhibit the driving of the switching element when the inhibition signal is received, and wherein the operating means operates the inhibition switching element so as to be turned off in order to not ground the output of the second power source for the drive circuit through the driver switching element and the inhibition switching element.

14. The passive safety device for vehicles according to claim 13, wherein the operating means operates the driver switching elements so as not to be simultaneously turned on, and wherein the firing circuit includes a high-side switching element connected to one end of a squib, and a low-side switching element connected to an other end of the squib, and wherein the switching element is connected to the firing circuit through a terminal to which the high-side switching element is connected.

15. The passive safety device for vehicles according to claim 9, wherein the operating means operates the driver switching elements so as not to be simultaneously turned on.

16. The passive safety device for vehicles according to claim 9, wherein the firing circuit includes a high-side switching element connected to one end of a squib, and a low-side switching element connected to an other end of the squib, and wherein the switching element is connected to the firing circuit through a terminal to which the high-side switching element is connected.

* * * * *